United States Patent [19]
Wagner

[11] Patent Number: 5,600,379
[45] Date of Patent: Feb. 4, 1997

[54] TELEVISION DIGITAL SIGNAL PROCESSING APPARATUS EMPLOYING TIME-BASE CORRECTION

[75] Inventor: Steven D. Wagner, Belmont, Calif.

[73] Assignee: Yves C. Faroudja, Los Altos Hills, Calif.

[21] Appl. No.: 322,753

[22] Filed: Oct. 13, 1994

[51] Int. Cl.$^6$ .............................. H04N 7/00; H04N 5/12
[52] U.S. Cl. ........................................ 348/497; 348/537
[58] Field of Search ................................... 348/536, 537, 348/538, 539, 540, 541, 542, 543, 497, 498, 501, 499, 512, 513, 516, 518, 572–575, 441, 448, 447, 390, 399, 440; 358/320, 324, 325; H04N 5/12, 5/04, 9/89, 7/00, 11/00

[56] References Cited

U.S. PATENT DOCUMENTS

| | | | |
|---|---|---|---|
| 4,675,724 | 6/1987 | Wagner . | |
| 4,729,025 | 3/1988 | Yanase | 348/537 |
| 4,876,596 | 10/1989 | Faroudja . | |
| 4,967,271 | 10/1990 | Campbell et al. . | |
| 4,982,280 | 1/1991 | Lyon et al. . | |
| 4,989,090 | 1/1991 | Campbell et al. . | |
| 5,121,207 | 6/1992 | Horrmann | 348/573 |
| 5,150,201 | 9/1992 | Mehrgardt et al. | 348/539 |
| 5,159,451 | 10/1992 | Faroudja et al. . | |
| 5,291,280 | 3/1994 | Faroudja et al. . | |
| 5,335,074 | 8/1994 | Stec | 348/537 |
| 5,337,199 | 8/1994 | Arai et al. . | |
| 5,347,314 | 9/1994 | Faroudja et al. . | |
| 5,355,328 | 10/1994 | Arbeiter et al. | 348/440 |
| 5,367,337 | 11/1994 | Pyle et al. | 348/537 |
| 5,367,338 | 11/1994 | Rothemel et al. | 348/536 |

OTHER PUBLICATIONS

"A Digital Framestore Synchronizer" Brian Matley; *SMPTE Journal*, Mar. 1976, pp. 385–388.

"Digital Time–Base Correction for Video Signal Processing" D. Acker, R. McLean; *SMPTE Journal*, Oct. 1976, pp. 146–150.

"Overview of Time–Base Correction Techniques and Their Applications" K. Sadashige; *SMPTE Journal*, Nov. 1991, pp. 787–791.

"Sampling–Rate Conversion of Video Signals", A. Luthra, G. Rajan; *SMPTE Journal*, Nov. 1991, pp. 869–879.

"Clock Rate Conversion for Digital Video", Jukka Hamalainen; *SMPTE Journal*, Jun. 1992, pp. 394–398.

"Specification Sheet, MultiGEN GF9101 High Performance Multirate Digital Filter", *Gennum Corporation*, Ontario, Canada, Oct. 1993, 21 pages.

"Bt812 NTSC/PAL to RGB/YCrCB Decoder" Advance Information Brooktree Corporation, Nov. 19, 1993, 51 pages.

*Primary Examiner*—Michael Lee
*Attorney, Agent, or Firm*—Thomas A. Gallagher

[57] ABSTRACT

A color television signal, digitized by a sampling clock asynchronous with respect to the television signal's horizontal synchronizing pulses, is applied to a dynamically programmable digital filter which upsamples or downsamples the received digitized television signal over short time periods in response to time-base disturbances in the signal. The user may also select a higher or lower long-term clock frequency. Resampled digital samples are applied to a FIFO memory for readout at a clock rate which follows the time-averaged horizontal frequency of the received digitized television signal, or, alternatively, at a substantially fixed clock rate, asynchronous with respect to the horizontal line frequency of the received digitized color television signal.

19 Claims, 3 Drawing Sheets

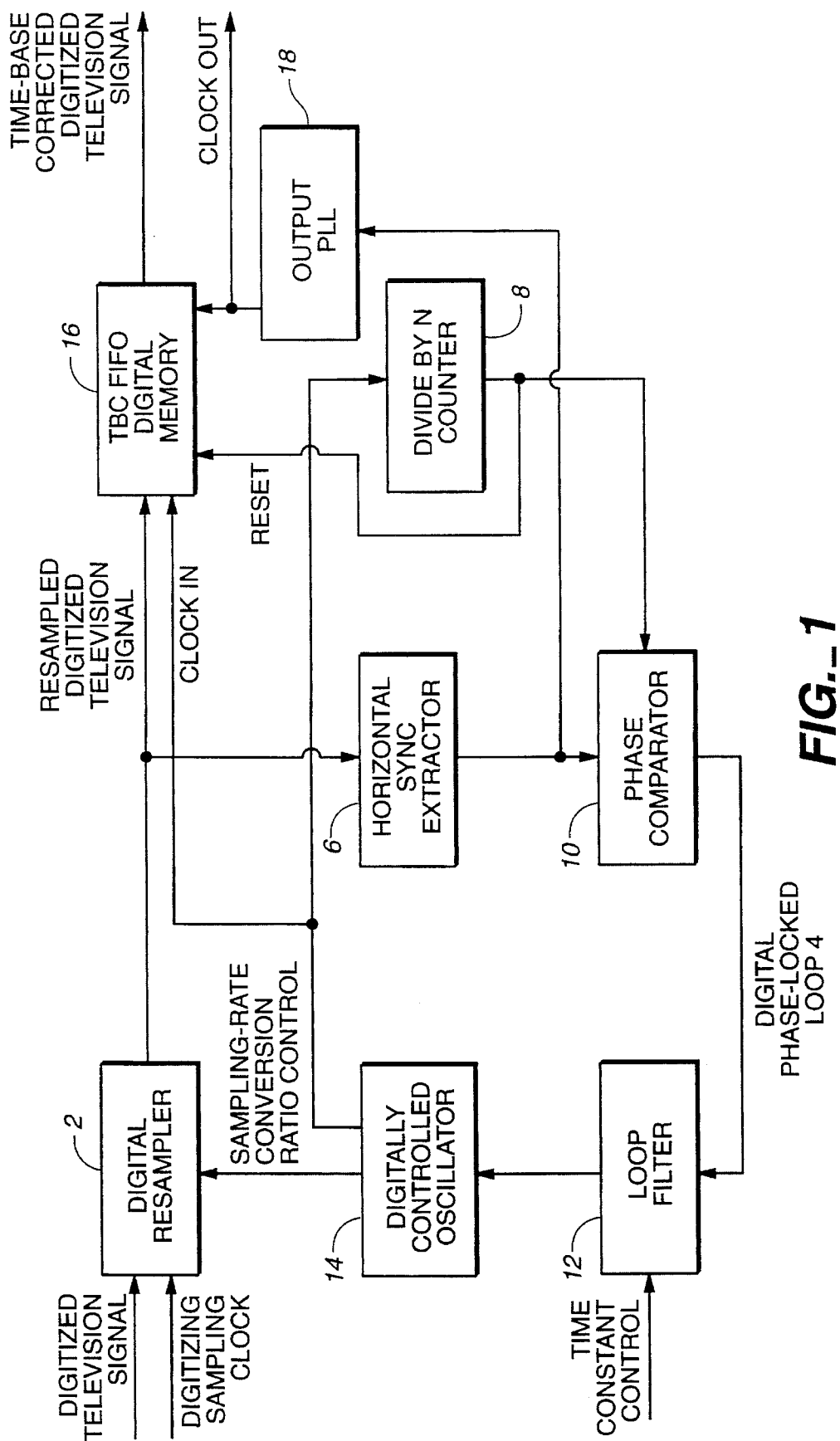
FIG._1

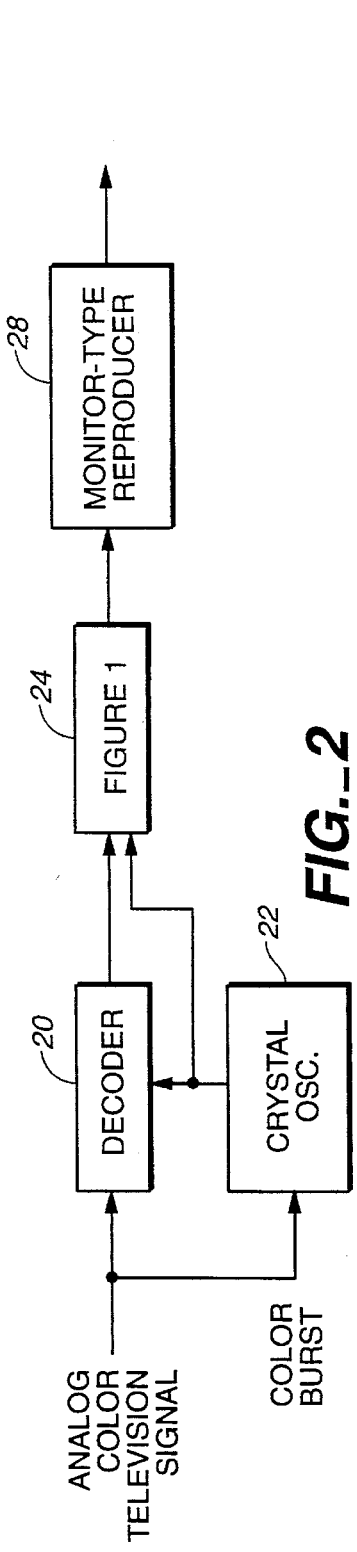
FIG._2
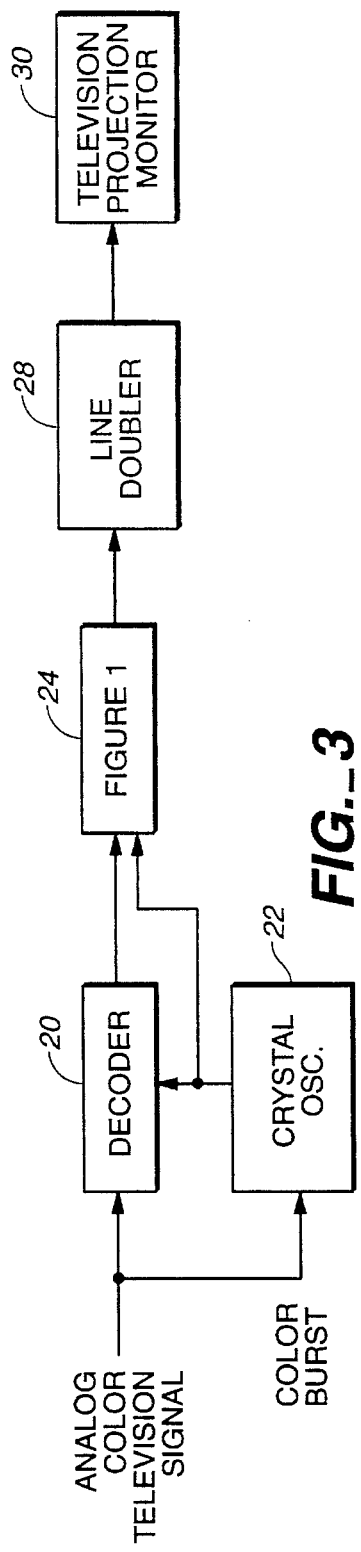
FIG._3
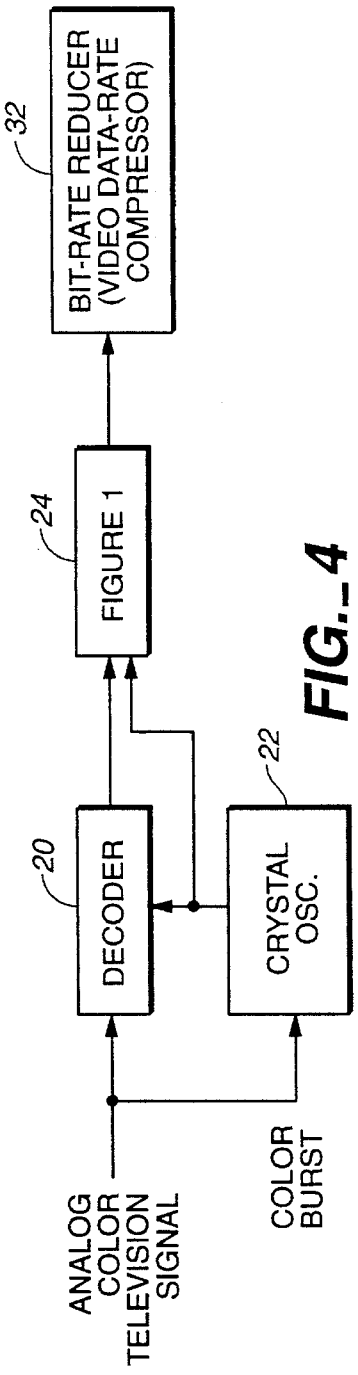
FIG._4

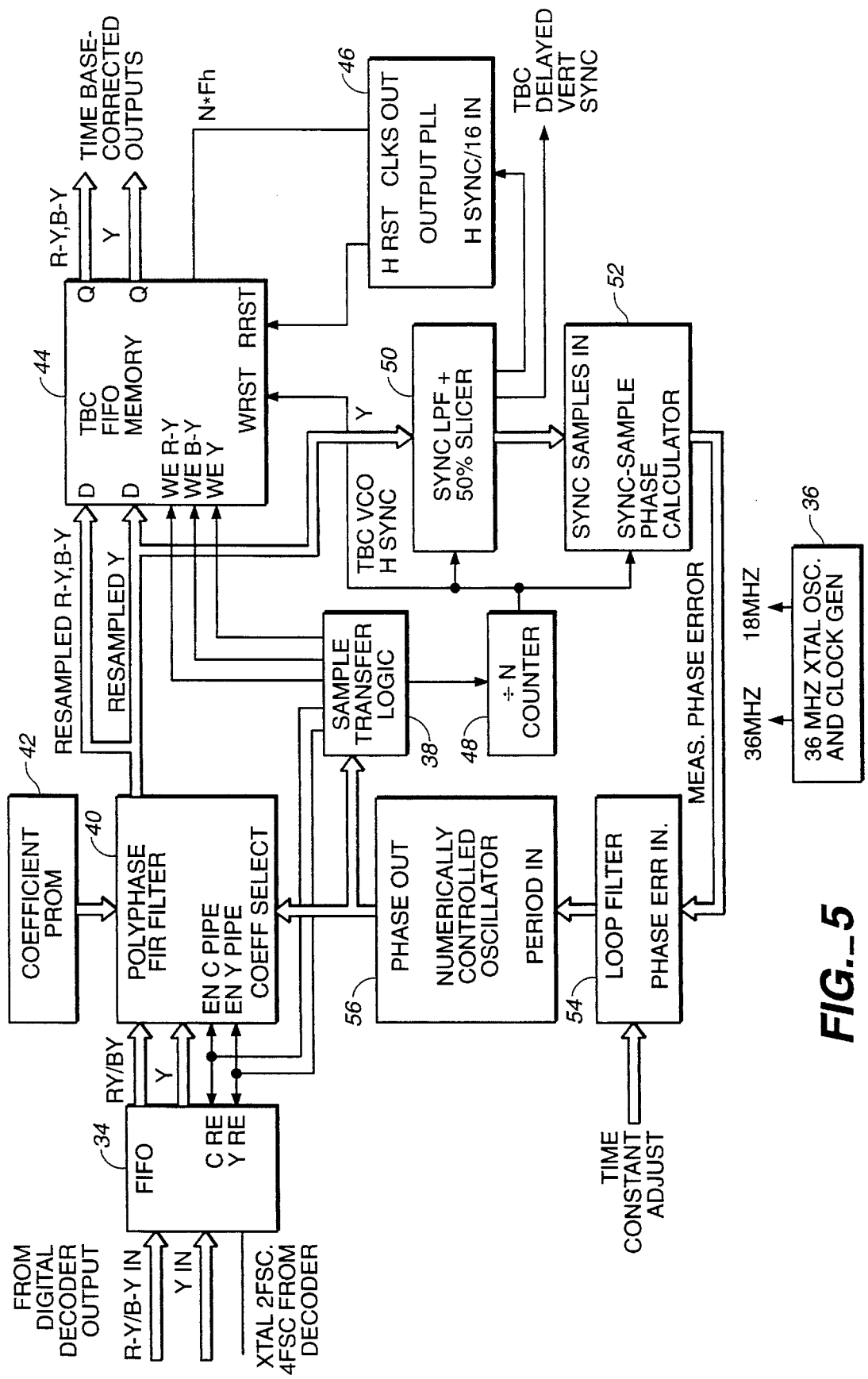
FIG._5

TELEVISION DIGITAL SIGNAL PROCESSING APPARATUS EMPLOYING TIME-BASE CORRECTION

FIELD OF THE INVENTION

The invention relates generally to the signal processing of digital television signals. More particularly, the invention relates to a processor for time-base correcting a digitized television signal which has been digitized by a sampling clock asynchronous with respect to the television signal's horizontal line frequency, such that, if uncorrected, the number of samples per horizontal line may vary and the time alignment of the first sample of each horizontal line may vary. The invention also relates to the simultaneous time-base correction and sampling rate conversion of such a digitized television signal so that the processed digitized television signal has a clock rate different from the clock rate of the received signal in order to interface between digital television devices operating at different sampling-clock rates.

Although it is not necessarily limited to use in such environments, the invention is particularly adapted for use in environments in which a television signal having timing disturbances (time-base errors) is (1) produced by a consumer-type analog videotape recorder/reproducer (hereinafter "VTR") (such as one employing the VHS format), (2) transformed from analog to digital form by a decoder having an analog-to-digital converter with a sampling-clock frequency synchronous with the analog television signal's color burst (typically a clock rate two or four times the subcarrier frequency) but asynchronous with respect to the signal's synchronizing pulses, the signal's color burst and synchronizing pulses being asynchronous with respect to each other (such as is produced by a VTR employing the "color under" technique in which the luminance and chrominance information have different time-base error profiles), and (3) the digitized television signal is applied directly to a monitor-type reproducer (such as, for example, a television projection monitor or a computer monitor) or digital signal processor (such as, for example, a line doubler or a digital-bit-rate reducer, e.g. video "compressor") requiring a highly stable relationship between the pixel clock rate of the digital television signal and its synchronizing pulses, and, in addition, possibly requiring a clock rate different from the clock rate of the received digitized television signal in order to match the required input clock rate of the processing device or display device.

BACKGROUND OF THE INVENTION

Time-base correction of television signals in various forms has been known from the time of the earliest practical VTR in the 1950s. Time-base correction typically seeks to reduce short term and/or long term timing variations in a television signal, particularly one reproduced by a VTR. Time-base correction may also seek to synchronize the horizontal synchronizing (hereinafter "horizontal sync" or "H sync") pulses to an external reference.

The first electronic time-base correctors employed analog circuitry using variable analog delay lines for altering the timing of signals containing time-base errors. When digital memories became available, so-called "digital" time-base correctors came into use. Such "digital" time-base correctors were analog devices in which the variable delay lines were implemented by an analog-to-digital (hereinafter "A/D") converter feeding a digital memory, the output of which was converted back into the analog domain by a digital-to-analog (hereinafter "D/A") converter. Variable delay was achieved by modulating either the clock of the A/D input or the D/A output. An example of such an approach is set forth in my U.S. Pat. No. 4,675,724 in which time-base correction is achieved by modulating the sampling clock in the A/D converter.

Prior art "digital" time-base correctors of the type just described require either (a) access to the A/D or D/A converter, which may not be possible, or (b) subjecting an already digitized television signal to A/D and D/A conversion, which results in signal degradation and cannot be practically implemented in a single integrated circuit device.

Time-base correction takes on a somewhat different meaning in the case in which an analog television signal has been digitized by a stable sampling clock which is asynchronous with respect to the horizontal line frequency of the television signal. In that case, the digitized television signal samples (a sample representing picture information is referred to as a "pixel") are timed in accordance with the stable sampling clock, but the underlying television signal is not in phase with the sampling clock and may contain time base errors. Time base errors may cause the time period of a horizontal line to be shorter or longer than the time period which would result at the nominal (i.e., long-term) horizontal line frequency of the television signal. Thus, because the sampling-clock rate remains constant while the horizontal line time period may vary, some lines may contain more samples or fewer samples than the number of samples per line resulting when the short-term frequency of the television signal is at its nominal frequency.

The problem of suppressing time-base errors in such digitized television signals is exacerbated (a) if access to the A/D converter is not available or (b) if such access is possible, if it is not desirable to digitize the analog television signal other than with a sampling clock which is asynchronous with respect to the horizontal line frequency of the television signal.

An example of the latter case is in the decoding of the analog signal from a VHS-type consumer VTR. There is no stable relationship between the color burst phase and the horizontal sync pulses of the signal. It is preferred to decode such signals into a component color signal having separated luminance and chrominance using an A/D converter with a clock synchronized to the signal's color burst rather than with a clock synchronized to the signal's horizontal sync (such a clock thus being asynchronous with respect to the horizontal sync). This is because burst locked decoding results in good luminance/chrominance separation (comb filters employed for such separation rely on the phase reversal of the chroma in alternate lines of an NETS signal, requiring precise phasing of the chroma with respect to the clock), whereas horizontal line locked decoding results in poor luminance/chrominance separation.

One prior art arrangement resamples a television signal already digitized by a clock asynchronous with the horizontal line frequency of the signal by producing new interpolated samples at times when a line-locked clock would have produced samples of the television signal. However, the interpolation is controlled by a feed-forward (open loop) control arrangement. Such an approach estimates future time-base error and seeks to correct it by measuring the time base error at the beginning of a horizontal scan line and applying the correction over the next scan line. Because it is a feed-forward control, the error measurement and correction applied as a result of the measurement must be very precise. Such an open loop system is not inherently self-correcting and may result in the accumulation of uncorrected errors. In addition, a feed-forward arrangement is likely to react too quickly to noise in the received signal.

Most time-base disturbances are caused by mechanical effects in the VTR: the scanner may speed up or slow down due to bearings or friction. The principal large time base error is at the beginning of the video field when the head comes "off" the tape and goes "on" again, making a full traverse from one edge of the tape to the other. If the tape is stretched too tightly or not tightly enough, there may be a tension error that can be half a line of video, hundreds and hundreds of pixels (a typical line may have in the order of 500 to 1200 pixels, depending on the clock frequency). Time-base correctors need not instantly correct for such large errors because such errors occur during the initial portion of each television field (up to about 20 lines) prior to the start of picture information and, thus, are not displayed by the reproducer (however, the presence of copy-protection signals in the vertical interval may shorten the number of lines available for recovery off the screen unless the time-base corrector removes the copy-protection signals). Consequently, it is generally sufficient for a time-base corrector to correct for such large time-base errors within 5 to 10 lines.

Smaller time base errors occur during the field when the video head is "on" the tape-typically a fraction of a sample up to a few samples. The magnitude of such large and small time-base errors depends on the quality of the VTR, consumer VTRs having time-base errors of a magnitude significantly higher than professional broadcast-quality VTRs.

A typical consumer television set is generally able to satisfactorily reproduce signals from consumer VTRs having time-base errors as just described. This is because such television sets have horizontal oscillators with time constants of about 5 to 10 lines, which provide a type of "built-in" time-base corrector action. However, unlike a conventional consumer television set, a monitor-type reproducer (such as a television projection monitor or a computer monitor) or digital signal processor (such as a line doubler or a digital-bit-rate reducer, e.g. video "compressor") requires a highly stable relationship between the pixel clock rate of the digital television signal and its synchronizing pulses.

SUMMARY OF THE INVENTION

In accordance with the teachings of the present invention, a time-base corrector is provided which receives a digitized color television signal in which the digital samples represent an analog television signal digitized by a sampling clock asynchronous with respect to the television signal's horizontal synchronizing pulses. Thus, the number of samples per horizontal line may vary and the time alignment of the first sample of each horizontal line may vary with respect to the horizontal synchronizing pulse of the respective line. The time-base corrector includes means for resampling the digitized color television signal to produce resampled digital samples and the means has a controllable sampling-rate-conversion ratio. Further means form a feedback loop around the means for resampling for controlling the sampling-rate-conversion ratio of the means for resampling. In addition, the time-base corrector includes means for storing the resampled digital samples and means for reading out stored resampled digital samples. Each of the means, except for the means for reading out, operates exclusively in the "digital domain," meaning that the means consist exclusively of logical devices and/or software controlled digital signal processing analogs of logical devices and that the signals going into, within and coming out of the means are in binary or digital code word form. In one embodiment, the means for reading out includes an analog phase-locked loop; in other respects, the means for reading out operates exclusively in the digital domain.

The feedback loop may comprise a digital phase-locked loop (PLL) which is responsive to a comparison of (a) the time alignment of a resampled sample representing the beginning of each horizontal television line with respect to the horizontal synchronizing pulse of each horizontal television line in the digitized television signal at the output of the resampling means, and (b) a predetermined number of samples with respect to the number of resampled samples of each horizontal television line at the output of the resampling means.

Feedback-loop control of the resampling means rather than feed-forward control assures that the time-base corrector is self-correcting and does not accumulate errors in controlling the resampling means. Moreover, it is believed that a feedback-loop control may be less sensitive to noise in the received signal than feed-forward control.

The means for resampling may comprise a dynamically programmable digital filter such as a dynamically programmable polyphase FIR filter, the sampling rate of which is instantaneously controlled by a set of coefficients defining the taps of the FIR filter, a digitally-controlled oscillator forming a part of the phase-locked loop selecting the sets of coefficients.

The means for controlling controls the sample-rate-conversion ratio of the means for resampling such that (a) if the resampled sample representing the beginning of the horizontal line lags the horizontal synchronizing pulse, the sample-rate-conversion ratio is altered to increase the frequency of the resampled samples (upsampling); (b) if the resampled sample representing the beginning of the horizontal line leads the horizontal synchronizing pulse, the sample-rate-conversion ratio is altered to decrease the frequency of the resampled samples (downsampling); and (c) if the horizontal synchronizing pulse is in phase with the resampled sample representing the beginning of the horizontal line, the sample-rate-conversion ratio is not altered. Such upsampling and downsampling is over short time periods in response to time-base disturbances in the received digitized television signal.

The time-base corrector may also alter the sampling clock frequency of the received digitized television signal over a long-time period to a user-selected higher or lower clock frequency. Such alterations in sampling clock frequency are typically substantial, as for example when the sampling clock frequency of the received digitized television signal is changed from a multiple of the color subcarrier frequency to a multiple of the horizontal line frequency. Thus, if it is not desired to change the clock frequency, the predetermined number of samples is the same as the number of samples per horizontal line at the nominal frequency of the received digitized color television (the "predetermined number of samples," mentioned above, determine the nominal output clock frequency and are employed in the phase comparator of the phase-locked loop). For upsampling, the predetermined number of samples is greater than the number of samples per horizontal line at the nominal frequency of the received digitized color television. For downsampling, the predetermined number of samples is less than the number of samples per horizontal line at the nominal frequency of the received digitized color television.

In one embodiment, the means for reading out reads out the television signal at a clock rate which follows the time-averaged horizontal frequency of the received digitized television signal. In this case, the means for storing stores samples representing at least one horizontal television line and preferably about four horizontal television lines, which is typically sufficient for correcting time-base errors in signals whose source is a consumer VHS-type VCR.

In an alternative embodiment, the means for storing stores samples representing at least a complete frame of the television signal and the means for reading out reads out the television signal at a substantially fixed clock rate, asynchronous with respect to the horizontal line frequency of the received digitized color television signal.

In either of the just-mentioned embodiments, the means for storing said resampled digital samples includes means for writing in resampled samples at a rate which is a multiple of the horizontal line frequency of the feedback loop output. The feedback loop horizontal frequency follows the horizontal line frequency of the received television signal, subject to the slewing rate of the feedback loop. Thus, in the embodiment in which the means for reading out reads out the television signal at a clock rate which follows the time-averaged horizontal frequency of the received digitized television signal, the means for storing will not overflow or underflow provided that the storing means has sufficient storage capacity to handle short term discrepancies in the write in/read out rates as a result of time-base disturbances. As mentioned above, a storage capacity of about four lines has been found to be sufficient for the case when the source is a VHS-type consumer VCR, which is probably the "worst case" signal source. As is conventional, the storage means is operated so that it is "centered" (i.e., about half full) for the steady state condition in which the long-term read in frequency is the same as the long-term read out frequency.

In accordance with the other aspects of the present invention, the time-base corrector of the present invention is embodied in a television signal processing and reproduction system.

BRIEF DESCRIPTION OF THE DRAWINGS

FIG. 1 is functional block diagram of a preferred embodiment of the time-base corrector according to the present invention.

FIG. 2 is functional block diagram of a preferred embodiment of a television signal processing and reproduction system according to the present invention incorporating the timebase corrector described in connection with the embodiment of FIG. 1.

FIG. 3 is a functional block diagram of a preferred embodiment of another television signal processing and reproduction system according to the present invention incorporating the time-base corrector described in connection with the embodiment of FIG. 1.

FIG. 4 is a functional block diagram of a preferred embodiment of yet another television signal processing and reproduction system according to the present invention incorporating the time-base corrector described in connection with the embodiment of FIG. 1.

FIG. 5 is a more detailed functional block diagram of a preferred embodiment of the time base corrector according to the present invention.

DETAILED DESCRIPTION

Referring now to FIG. 1 of the drawings, the time-base corrector aspect of the present invention is shown. A digitized television signal along with the digitizing sampling clock is received by a digital resampler 2. The digitizing sampling clock is a stable clock but it is asynchronous with respect to the horizontal sync frequency of the received television signal.

A feedback loop around the digital resampler, in the form of a digital phase-locked loop 4, controls the sampling-rate-conversion ratio of the digital resampler 2. The digital phased-lock loop includes a horizontal sync extractor 6, a divide by N counter 8, a phase comparator 10, a loop filter 12 having a controllable time constant (preferably, user settable frequency correction gain and phase correction gain), and a digitally controlled oscillator 14 providing the output of the digital phase-locked loop which controls the sampling-rate-conversion ratio of the digital resampler 2. Each of the elements 2, 6, 10, 12 and 14 operates in the digital domain. The loop filter time constant and DCO dynamic range determine the loop's maximum slewing rate.

The digital resampler 2 output provides resampled samples of the digitized television signal. These resampled samples are now related to the horizontal sync pulses and may have an unstable clock rate if the received television signal has time-base disturbances. The resampled samples are now related to the horizontal sync pulses in that they are synchronous or nearly synchronous (depending on the magnitude of short term time-base disturbances and the slewing rate of the digital phase-locked loop) with the horizontal sync pulses and that there are a constant or nearly constant (again, depending on the magnitude of short term time-base disturbances and the slewing rate of the digital phase-locked loop) number of resampled samples per horizontal line. The desired number of resampled samples per horizontal line is chosen by setting "N" in the divide by N counter 8 equal to the desired number. A typical number for N may fall, for example, in the range of 500 to 1200. Because of the feedback controlled resampling of the digitized television signal, the resampled samples are essentially the same samples that would have been produced if the original analog television signal had been digitized by a sampling clock locked to the television signal's horizontal line frequency.

If it is desired to change the clock frequency of the input to the digital resampler 2 to a different clock frequency, the number N may be chosen so as to provide the desired output frequency.

The resampled samples are applied to a time-base corrector (TBC) first-in/first-out (FIFO) digital memory 16 which provides at its output the time-base corrected digitized television signal at a stable output clock frequency. The resampled samples are clocked into the TBC FIFO memory at N times the horizontal line frequency of the feedback loop's digitally controlled oscillator 14. The memory is reset by the output of the divide by N counter 8. The resampled samples may be clocked out of the TBC FIFO memory 16 by a clock based on a long-term average of the received television signal's horizontal line frequency. This may be achieved by applying the extracted horizontal sync pulses from block 6 to an output digital phased-lock loop 18 which has a time constant of about 20 to 500 lines. The clock generated by the output phase-locked loop is also the output clock of the time-base corrector. This arrangement is appropriate when the TBC FIFO memory 16 has a storage capacity of only a few lines and some long term variations in the frequency of the output clock may be tolerated. If a highly stable output clock is required, which has substantially no long-term variations, the output PLL 18 may be replaced by a stand-alone oscillator which is totally independent of other clocks and frequency rates in the system. In this case the TBC FIFO memory must be a frame synchronizer which has sufficient storage capacity to store a complete television frame or the received digital input video must be vertically and horizontally locked on average to a reference to which PLL 18 is also locked.

In operation, the digital phase-locked loop 4 controls the sampling-rate-conversion ratio of the digital resampler 2 such that (a) if the resampled sample representing the beginning of the horizontal line lags the horizontal synchronizing pulse, the sample-rate-conversion ratio is altered to increase the frequency of the resampled samples; (b) if the resampled sample representing the beginning of the horizontal line leads the horizontal synchronizing pulse, the sample-rate-conversion ratio is altered to decrease the frequency of the resampled samples; and (c) if the horizontal synchronizing pulse is in phase with the resampled sample representing the beginning of the horizontal line, the sample-rate-conversion ratio is not altered.

The digital resampler 2 may be a dynamically programmable digital filter. In a preferred embodiment, as described in further detail below in connection with FIG. 5, the dynamically programmable digital filter is a dynamically programmable polyphase FIR filter, the sampling phase of which is instantaneously controlled by a set of coefficients defining the taps of the FIR filter. Sets of coefficients are dynamically selected by the digitally controlled oscillator 14 of the digital phase-locked loop 4. The sampling rate of the filter is set by the rate at which the DCO 14 cycles through sets of coefficients.

Referring now to FIG. 2, an analog color television signal is applied to a conventional decoder 20 which digitizes the television signal by an analog-to-digital conversion using a sampling clock derived from a crystal oscillator 22 which is phase locked to the color burst of the analog color television signal. Such crystal oscillators have a clock frequency which is typically two or four times the color subcarrier frequency (2 $f_{sc}$ or 4 $f_{sc}$, respectively. If there is no fixed relationship between the frequency and phase of the horizontal line frequency with respect to the color burst, which is the case when the analog television signal is reproduced from a VHS-type consumer VCR, the sampling clock frequency will be asynchronous with respect to the television signal's horizontal line rate. Moreover, time-base disturbances in the television signal will result in television lines having a varying number of samples as the time period of the lines compresses and expands.

Decoder 20 provides at its output a digitized component form of the applied analog television signal, the component signal having separated luminance and chrominance components. The decoder output and sampling clock are applied to the time-base corrector 24 as described in connection with FIG. 1. The output of the time-base corrector is applied, via a suitable device (not shown) which at least includes digital-to-analog conversion, to a monitor-type reproducer 26, such as a computer monitor or a television projection monitor, which requires an analog video input that has been time-base stabilized to a highly stable clock locked to the television signal's horizontal line frequency. Alternatively, a digitized television signal having time-base disturbances and digitized using a sampling clock asynchronous with respect to the horizontal line frequency of the television signal may originate from an arrangement other than decoder 20 and color-burst-locked crystal oscillator 22.

In FIG. 3, an analog color television signal is applied to a conventional decoder 20 which has an associated crystal oscillator 22 locked to the input television signal's color burst as a clock source, in the manner of the FIG. 2 arrangement. The output of the time-base corrector 24 is applied to a conventional line doubler 28 which in turn applies its line-doubled output to a conventional projection television monitor 30. Such monitors are frequently used with line doublers. In order to avoid visually annoying picture jitter in the projection monitor display (horizontal and vertical movement of the displayed image), the line doubler input requires a signal having a highly stable clock locked to the signal's horizontal line frequency. Suitable line doublers are described in U.S. Pat. Nos. 5,347,314; 5,291, 280; 5,159,451; 4,989,090; 4,982,280; 4,967,271; 4,876, 596. Alternatively, as with respect to the embodiment of FIG. 2, a digitized television signal having time-base disturbances and digitized using a sampling clock asynchronous with respect to the horizontal line frequency of the television signal may originate from an arrangement other than decoder 20 and color-burst-locked crystal oscillator 22.

In FIG. 4, an analog color television signal is applied to a conventional decoder 20 which has an associated crystal oscillator 22 locked to the input television signal's color burst as a clock source, in the manner of the FIG. 2 arrangement. Decoder 20 provides at its output a digitized component form of the applied analog television signal, the component signal having separated luminance and chrominance components. The decoder output and sampling clock are applied to the time-base corrector 24 as described in connection with FIG. 1. The output of the time-base corrector is applied to a digital bit-rate reducer (video data rate compressor) 32. Bit-rate reducers require as their input a signal having a highly stable clock locked to the signal's horizontal line frequency. Alternatively, as with respect to the embodiment of FIG. 2, a digitized television signal having time-base disturbances and digitized using a sampling clock asynchronous with respect to the horizontal line frequency of the television signal may originate from an arrangement other than decoder 20 and color-burst-locked crystal oscillator 22.

Referring now to FIG. 5, an input FIFO 34, which may have a relative small storage capacity, such as four clock cycles, receives the digitized television signal outputs (not shown in this Figure) The inputs received from the digital decoder are, for example, a 9-bit multiplexed R-Y/B-Y chrominance components, a 9-bit luminance component and the fixed nominal frequency clock (at 2 $f_{sc}$ or 4 $f_{sc}$, for example) used by the decoder to digitize the television signal. The digital video inputs include active video and sync pulses.

The purpose of input FIFO 34 is to resynchronize the incoming video data to the stable, free-running system clocks generated by crystal oscillator and clock generator 36. The clock frequencies may be, for example 36 MHz and 18 MHz in a practical embodiment. The input FIFO 34 effectively decouples the digital input samples from the remaining parts of the time-base corrector in order to control the clock rate at which the input samples are used by the time-base corrector. Such a decoupling input FIFO is a conventional digital design element and may be considered, along with the sample transfer logic associated with it, to be a functional part of the digital resampler 2 of the simplified FIG. 1 embodiment. The input FIFO readout clock is preferred to be higher than the maximum clock rate of the digital input samples, although in theory it could be the same. For example, an 18 MHz readout clock rate may be used when the expected input video has a rate of 17.7 MHz. Thus, the input FIFO cannot overflow, but can be emptied.

This explained further below. Samples from input FIFO 34 are readout under the control of a sample transfer logic 38, described below.

The re-clocked R-Y/B-Y and Y video samples from input FIFO 34 are applied to a dynamically programmable polyphase FIR filter 40. The instantaneous (each clock cycle) FIR digital filter taps are controlled by selecting one of a set of coefficients which may be stored in a random-access memory (RAM) contained within the filter 40. The RAM is initialized from a coefficient programmable-read-only memory (PROM) 42 at the time of circuit power-up.

A suitable programmable polyphase FIR filter may be implemented using a model GF9101 High Performance Multirate Digital Filter, an integrated circuit microchip device manufactured by Gennum Corporation of Burlington, Ontario, Canada. The GF9101 is a 12-tap filter with enough internal RAM to hold 108 individual filters. An externally controlled address bus selects one of the 108 filters in each clock cycle. Details of the GF9101 are set forth in the device's data sheet: *Gennum Corporation, MultiGen GF9101 High Performance Multirate Digital Filter, Data Sheet*, Document No. 520-64-4, Burlington, Ontario, Canada, 1992, 21 pages. The use of such filters for video sampling rate conversion is well-known. See, for example: "Sampling-Rate Conversion of Video Signals" by Ajay Luthra, et al, SMPTE Journal, November 1991, Vol. 100, No. 11, pp. 869–879 and "Clock Rate Conversion for Digital Video" by Jukka Hamalainen, *SMPTE Journal*, June 1992, Vol. 101, No. 6, pp. 394–398.

The polyphase FIR filter 40 forms each output sample as a weighted sum of a plurality of adjacent input samples. The particular sample weighting coefficients are chosen to effect a time shift equal to the required instantaneous time difference between an input sample and an output sample. In order to be able to select time differences in the range from zero to one sample period, the multiplicity of sample weighting coefficient sets stored in the filter's RAM are predetermined to provide such a selection, any set being selectable instantly at each output sample time. The filter 40 thus may provide "fine" sample time shifts of up to one sample period. The number of incremental sample time shifts in the range of zero to one sample period will depend on the number of sets of available filter coefficients, a practical limit being set by a reasonable RAM size. As will be explained below, "coarse" sample time shifts of more than one sample period are accomplished in another way in the feedback loop (to be described) which selects the filter 40 coefficients.

The output of polyphase FIR filter 40 is 9-bit video data at a controlled resampling rate. In a practical embodiment, a single pipeline within the polyphase FIR filter is employed in order to economize on hardware, resulting in a filter 40 output which is the resampled R-Y/B-Y chrominance data multiplexed with the resampled Y luminance data. The 36 MHz system clock is used in the multiplex processing of the 18 MHz video input data. It will be understood that the multiplexing of the chrominance and luminance data is an implementation detail and that it is not an essential feature of the invention.

Resampled video data from filter 40 is demultiplexed (by conventional means not shown) and valid R-Y/B-Y chrominance data samples and Y luminance data samples are separately written to the data inputs "D" of TBC FIFO memory 44 under control of the sample transfer logic 38. As will be explained further below, when implemented in the manner of this embodiment, certain samples produced by the filter 40 must be disregarded (in the case of downsampling), resulting in no sample for a particular clock period, and certain consecutive samples must be derived from the same input sample (in the case of upsampling). The selective writing to memory of sample outputs from a filter of this type is a conventional digital design feature and may be considered, along with the sample transfer logic associated with it, to be a functional part of the digital resampler 2 of the simplified FIG. 1 embodiment. If desired, filter 40 may be implemented using a more complex architecture such that every sample output is a valid sample.

TBC FIFO memory 44 should have the storage capacity to store samples for at least one line of video chrominance and luminance data. As discussed above, a storage capacity of four lines is preferred for use of the time-base corrector with VHS-type consumer VCRs. After resampled video data is written to the TBC memory 44, it is read out synchronously with a stable clock provided by a conventional reference analog phase locked-loop 46, having a crystal controlled or stable inductive-capacitive (CL) oscillator. PLL 46 is locked either to a horizontal reference derived from the horizontal sync in the resampled video signal, as explained further below, or from an external reference video signal (not shown). Alternatively, TBC memory 44 may be a conventional frame synchronizer, in which case its read clock is totally independent.

Referring again to the polyphase FIR filter 40, sample transfer logic 38 performs two separate functions, one related to reading out data from input FIFO 34 and the other related to reading out valid samples from filter 40 and writing them into TBC FIFO 44.

Data is read out of input FIFO 34 by controlling the chrominance and luminance data readout enables "C RE" and "Y RE," respectively and reading it into the filter 40 by controlling the chrominance data and luminance data write in enables "EN C PIPE" and "EN Y PIPE," respectively. Note that in a practical implementation there are write enable controls for functionally separate chrominance data and luminance data pipelines—the luma and chroma may start and stop independently of each other, although the two pipelines are multiplexed on a single pipeline. Thus in order to economize on hardware, filter 40 functions as two digital filters, one for luma, one for chroma operating in parallel. The only thing common about them is that they are running at the same or related sampling frequency. But they may start and stop independently. The pipeline clock is 36 MHz, for example. For half the time the filter process luma samples and the other half of the time chroma samples. The output is the multiplexed stream of a resampled luma samples and a resampled chroma samples at 36 MHz which is subsequently split back into two streams of 18 MHz.

The sample transfer logic reads samples from the FIFO until it is empty and then it holds the entire process, turning off the clocks for the polyphase filter 40, allowing the input FIFO to fill up again. When the input FIFO has enough samples, the sample transfer logic resumes the polyphase filter clocks and moves the samples out of the FIFO into the polyphase filter 40 and the resampled samples on to the TBC FIFO memory 44.

With respect to the second function of the transfer logic 38, it detects when on a particular clock cycle the resampled sample put out by filter 40 is not valid and does not write such a sample to the TBC FIFO memory 44. This occurs for some samples when the filter is downsampling. The sample transfer logic 38 controls writing to memory 44 by controlling its three write-in enables "WE R-Y," "WE B-Y," and "WE Y," respectively. The two multiplexed resampled R-Y and B-Y chrominance components are demultiplexed into their constituent components in order to simplify interfacing to the memory. When the filter 40 is upsampling, some consecutive filter output samples must be derived from the same input sample. In that case, the sample transfer logic 38 stops the pipeline for one clock cycle in order to produce two output samples from the same set of input samples in the pipeline. Such operation of a polyphase filter to provide downsampling and upsampling are known.

The sample transfer logic 38 increments a divide by N counter 48 when a resampled Y sample is written to the TBC FIFO memory 44. The decision of sample transfer logic 38 to write a Y sample to the memory 44 is based on its decoding of the filter coefficient set selection instructions provided by the feedback loop (described further below) in order to determine the time position of each resampled sample within each clock cycle (thus, the timing of the resampled samples is not synchronous with the system clocks). Consequently, the divide by N counter is incremented in accordance with the timing of the resampled samples (whose timing now attempts to follow, subject to the slewing rate of the feedback loop, the horizontal line rate of the input television signal, including short term variations in that rate due to time-base disturbances). The sample transfer logic 38 forms a part of known prior art sampling rate converters.

The number "N" of the divide by N counter 48 is selected by a user and pre-loaded into the counter. "N" determines the desired number of samples per horizontal line. Thus, the output of counter 48 is a stream of samples representing the horizontal sync rate of the feedback loop output. Each pulse from counter 48 is arbitrarily considered to be the "first" sample of each video line and is applied to the 50% slicer portion of a sync LPF and 50% slicer 50 in order to establish a "window" in which to look for the leading edge of the horizontal sync pules. The sync LPF and 50% slicer 50 also receives demultiplexed Y video data put out by filter 40. Each pulse from counter 48 is also applied the "WRST" write reset input of the TBC FIFO memory 44 (the "WE" inputs, mentioned above, clock data into the next available memory location; "WRST" resets write to the first memory location in memory. Each pulse from counter 48 is yet also applied to a sync-sample phase calculator 52, which functions as a phase comparator. The sync LPF and 50% slicer 50 lowpass filters the sync to remove noise and establishes a 50% slice level by averaging filtered sync tip and back porch digital video samples. Such devices are well known in the art.

Phase calculator 52 also receives a stream of pulses indicating, with considerable accuracy, the time of the 50% point of the leading edge of the television signal's horizontal sync pulse. The phase calculator 52 performs arithmetic to determine precisely the phase error between the first resampled video sample of a new scan line from filter 40 and the 50% sync slice crossing point and also, if the phase error is more than one clock period, the number of clock cycles between the occurrence of the divide by N pulse and the sync leading edge 50% slice crossing. Thus, the phase calculator compares the television signal's H sync (i.e., the time alignment of a resampled sample representing the beginning of each horizontal television line) to the feedback loop's H sync (which is the same as the horizontal synchronizing pulse of each horizontal television line in the digitized television signal at the output of the filter 40) in order to generate a phase error measurement for controlling the feedback loop.

The just-described phase comparison provides the basis for both a "fine" (i.e., zero to one clock period, as discussed above) and "coarse" (more than one clock period) control of the filter 40. When the filter 40 puts out the first sample of a scan line, as marked by counter 48, in coincidence with the 50% slice crossing time of the sync edge, the measured phase error at the phase calculator 52 output will be zero. If the counter 48 pulse precedes the sync slice crossing time, the measured phase error will be of a first sense, for example, positive. If the counter 48 pulse occurs later than the sync slice crossing, the phase error will be of the other sense, for example, negative. Filter 40, as implemented, is only capable of shifting the resampled sample phase up to one clock period. Thus, if the phase error is multiple clock periods, shifting in the desired direction occurs in subsequent clock periods until the loop "catches up" with the television signal's horizontal sync.

The phase error measurement provided by phase calculator 52 is applied to a loop filter 54 which has a time constant adjustment. The loop filter puts out a period control word which controls the period of a digitally-controlled (numerically-controlled) oscillator (DCO or NCO) 56. The output of oscillator 56 sets the instantaneous sample conversion ratio of filter 40, selecting a set of filter coefficients. The DCO may be implemented by an accumulator that increments by a value representing one output sample period. It is incremented for each output sample produced at the filter 40 output. The DCO output is a ramp of phase values in which each phase value selects a corresponding coefficient set stored in RAM in filter 40. If the period supplied to the DCO 56 is at nominal value, the output sample rate will equal to the input rate. As the period value is increased, the filter 40 output sample period is increased relative to its input period resulting in downsampling, conversely, a decrease from nominal of the sample period value supplied to DCO 56 results in a filter 40 output sample period less than the input period, thus upsampling the signal. The output sample rate should be capable of smooth variation with respect to the input sample rate over a range sufficiently wide to process the largest time-base disturbances likely to be encountered.

If the input sampling rate of the Y, R-Y/B-Y inputs to filter 40 is precisely known and the input video contains no time-base errors, the sample period applied to the DCO 56 can be held at a constant value to provide the desired output sample rate, producing the desired number of samples per output video scan line (as selected by the choice of "N").

However, if the input sample rate is variable and/or the original video signal was time-base unstable, then the DCO 56 sample period must be varied automatically to produce the user specified output sample rate at a fixed number of samples per output video scan line. The phase locked-loop, described above, controls the sample period based on a measurement of the actual number of filter 40 output samples from one digitized video sync pulse to the next to produce the desired number of samples per line. Further, as described above, the loop controls the output sample phase with respect to the video so that the first resampled video value of each scan line lies within a close tolerance to the 50% point of the leading edge of the video sync pulse.

The sync LPF and 50% slicer 50 provides two further outputs. One, the horizontal sync, is applied to the control input of an output PLL having a long time constant. In a practical implementation, it is sufficient to apply a submultiple of the horizontal sync. In a practical embodiment, the H sync is divided by 16. The slicer 50 also provides a TBC delayed vertical sync—the sync 50% slicer derives composite sync (i.e., mixed horizontal and vertical sync) and contains a conventional vertical sync separator to put out the TBC delayed vertical sync which may be used by the line doubler, monitor, or compression device employed with the time-base corrector. The output PLL follows the long term horizontal line frequency of the input television signal. The output PLL 46 provides two outputs an "H RST" output, a horizontal memory read address reset and the clock output "CLK OUT," the memory read clock. The H RST output controls the RRST read reset input of the TBC FIFO memory 44. RRST resets the read address to the first address of the memory. The CLKS OUT provides the desired $N*f_H$ output clock rate. As mentioned above, this clock will follow any long term variations in the television input signal's horizontal line frequency. Thus, if the user desires a fixed, independent output clock, the TBC FIFO memory is a frame synchronizer in which the readout clock and output is independent of the applied television signal.

I claim:

1. A time-base corrector receiving a digitized color television signal made up of digital samples representing an analog television signal digitized by a sampling clock asynchronous with respect to the analog television signal's horizontal synchronizing pulses, whereby the number of digital samples in response to each horizontal line of the analog television signal may vary and the relative time alignment of the first digital sample of each horizontal line may vary with respect to the horizontal synchronizing pulse of the corresponding analog television signal's horizontal line, comprising means for resampling said digitized color television signal to produce resampled digital samples, said means for resampling having a controllable sampling-rate-conversion ratio;

means for controlling the sampling-rate-conversion ratio of said means for resampling, said means for controlling including a feedback loop having an input and an output, said feedback loop receiving said resampled digital samples at its input and providing a sampling-rate-conversion ratio control at its output;

means for storing said resampled digital samples;

means for reading out stored resampled digital samples; and wherein each of said first three recited means operates exclusively in the digital domain.

2. A time-base corrector according to claim 1 wherein said means forming a feedback loop comprises a digital phase-locked loop.

3. A time-base corrector according to claim 2 wherein said digital phase-locked loop is responsive to a comparison of (a) the time alignment of a resampled sample representing the beginning of each horizontal television line with respect to the horizontal synchronizing pulse of each horizontal television line in the digitized television signal at the output of said resampling means, and (b) a predetermined number of samples with respect to the number of resampled samples of each horizontal television line at the output of said resampling means.

4. A time-base corrector according to claim 2 or claim 3 wherein said means for resampling comprises a dynamically programmable digital filter.

5. A time-base corrector according to claim 4 wherein said dynamically programmable digital filter is a dynamically programmable polyphase FIR filter.

6. A time-base corrector according to claim 4 wherein said means for resampling comprises a dynamically programmable polyphase FIR filter, the sampling rate of which is instantaneously controlled by a set of coefficients defining the taps of the FIR filter, and wherein the phase-locked loop includes a digitally-controlled oscillator which selects a set of coefficients.

7. A time-base corrector according to claim 1 wherein said means for controlling controls the sample-rate-conversion ratio of said means for resampling such that (a) if the resampled sample representing the beginning of the horizontal line lags the horizontal synchronizing pulse, the sample-rate-conversion ratio is altered to increase the frequency of the resampled samples; (b) if the resampled sample representing the beginning of the horizontal line leads the horizontal synchronizing pulse, the sample-rate-conversion ratio is altered to decrease the frequency of the resampled samples; and (c) if the horizontal synchronizing pulse is in phase with the resampled sample representing the beginning of the horizontal line, the sample-rate-conversion ratio is not altered.

8. A time-base corrector according to claim 1 wherein the number of resampled digital samples per horizontal line is the same as the number of samples per horizontal line of the received digitized color television when the analog television signal from which the digitized color television signal is derived is at its nominal horizontal line frequency.

9. A time-base corrector according to claim 1 wherein the number of resampled digital samples per horizontal line is greater than the number of samples per horizontal line of the received digitized color television when the analog television signal from which the digitized color television signal is derived is at its nominal horizontal line frequency.

10. A time-base corrector according to claim 1 wherein the number of resampled digital samples per horizontal line is less than the number of samples per horizontal line of the received digitized color television when the analog television signal from which the digitized color television signal is derived is at its nominal horizontal line frequency.

11. A time-base corrector according to claim 1 wherein said means for reading out reads out the resampled digitized television signal at a clock rate which follows the time average of the horizontal frequency of the received digitized television signal.

12. A time-base corrector according to claim 11 wherein said means for storing stores samples representing at least one horizontal television line.

13. A time-base corrector according to claim 11 wherein said means for storing stores samples representing about four horizontal television lines.

14. A time-base corrector according to claim 1 wherein said means for storing stores samples representing at least a complete frame of the resampled digitized television signal and said means for reading out reads out the resampled digitized television signal at a substantially fixed clock rate, asynchronous with respect to the horizontal line frequency of the received digitized color television signal.

15. A time-base corrector according to either one of claims 11 or 14 wherein said means for storing said resampled digital samples includes means for writing in resampled samples at N times the horizontal line frequency of the output of said feedback loop, where N is the number of samples per line.

16. A television signal processing and reproduction system, comprising means for digitizing an analog color television signal, said means including analog-to-digital conversion means employing a sampling clock asynchronous with respect to the analog television signal's horizontal line frequency, whereby the number of digital samples in response to each horizontal line of the analog television signal may vary and the relative time alignment of the first digital sample of each horizontal line may vary with respect to the horizontal synchronizing pulse of the corresponding analog television signal's horizontal line;

time-base corrector means, including means for resampling said digitized color television signal to produce resampled digital samples, said means having a controllable sampling-rate-conversion ratio;

means for controlling the sampling-rate-conversion ratio of said means for resampling, said means including a feedback loop having an input and an output, said feedback loop receiving said resampled digital samples at its input and providing a sampling-rate-conversion ratio control at its output;

means for storing said resampled digital samples, means for reading out stored resampled digital samples;

wherein each of said first three recited means operates exclusively in the digital domain;

monitor-type reproducer means, said reproducer means requiring an analog video input that has been time-base stabilized to a highly stable clock locked to the television signal's horizontal line frequency; and means, includes digital-to-analog converter means, for coupling said time-base corrector means to said monitor-type reproducer means.

17. A television signal processing and reproduction system, comprising means for digitizing an analog color television signal, said means including analog-to-digital conversion means employing a sampling clock asynchronous with respect to the analog television signal's horizontal line frequency, whereby the number of digital samples in response to each horizontal line of the analog television signal may vary and the relative time alignment of the first digital sample of each horizontal line may vary with respect to the horizontal synchronizing pulse of the corresponding analog television signal's horizontal line;

time-base corrector means, including means for resampling said digitized color television signal to produce resampled digital samples, said means having a controllable sampling-rate-conversion ratio;

means for controlling the sampling-rate-conversion ratio of said means for resampling, said means including a feedback loop having an input and an output, said feedback loop receiving said resample digital samples at its input and providing a sampling-rate-conversion ratio control at its output;

means for storing said resampled digital samples;

means for reading out stored resampled digital samples;

wherein each of said first three recited means operates exclusively in the digital domain;

line doubler means receiving said read-out stored resampled digital samples, said line doubler means including digital-to-analog converter means; and monitor-type reproducer means receiving the output of said line doubler means, said reproducer means requiring an analog video input that has been time-base stabilized to a highly stable clock locked to the television signal's horizontal line frequency.

18. A television signal processing and reproduction system according to claim 17 wherein said monitor-type reproducer means comprises a television projection monitor.

19. A television signal processing and reproduction system, comprising means for digitizing an analog color television signal, said means including analog-to-digital conversion means employing a sampling clock asynchronous with respect to the analog television signal's horizontal line frequency, whereby the number of digital samples in response to each horizontal line of the analog television signal may vary and the relative time alignment of the first digital sample of each horizontal line may vary with respect to the horizontal synchronizing pulse of the corresponding analog television signal's horizontal line;

time-base corrector means, including means for resampling said digitized color television signal to produce resampled digital samples, said means having a controllable sampling-rate-conversion ratio;

means for controlling the sampling-rate-conversion ratio of said means for resampling, said means including a feedback loop having an input and an output, said feedback loop receiving said resampled digital samples at its input and providing a sampling-rate-conversion ratio control at its output;

means for storing said resampled digital samples, means for reading out stored resampled digital samples;

wherein each of said first three recited means operates exclusively in the digital domain; and digital bit-rate reducer means receiving said read-out stored resampled digital samples, said bit-rate reducer means requiring a video input that has been time-base stabilized to a highly stable clock locked to the television signal's horizontal line frequency.

\* \* \* \* \*